(12) United States Patent
de Kock et al.

(10) Patent No.: US 8,794,406 B2
(45) Date of Patent: Aug. 5, 2014

(54) STIFF DAMPER

(75) Inventors: Paul de Kock, Numansdorp (NL); Antonius Arnoldus Franciscus van Dongen, Rotterdam (NL); Samuel Jager, Mijnsheerenland (NL)

(73) Assignee: Koni B.V., Oud Beijerland (NL)

( * ) Notice: Subject to any disclaimer, the term of this patent is extended or adjusted under 35 U.S.C. 154(b) by 275 days.

(21) Appl. No.: 13/012,826

(22) Filed: Jan. 25, 2011

(65) Prior Publication Data
US 2011/0180361 A1 Jul. 28, 2011

(30) Foreign Application Priority Data
Jan. 25, 2010 (NL) .................................. 2004138

(51) Int. Cl.
*F16F 9/44* (2006.01)
(52) U.S. Cl.
USPC ...................................... 188/322.14; 188/315
(58) Field of Classification Search
USPC ................... 188/289, 315, 316, 317, 322.13, 188/322.14, 322.16, 297
See application file for complete search history.

(56) References Cited

U.S. PATENT DOCUMENTS

| | | | |
|---|---|---|---|
| 3,892,298 A | 7/1975 | Blatt | |
| 4,535,998 A * | 8/1985 | Katz | 188/322.17 |
| 5,372,223 A * | 12/1994 | DeKock | 188/285 |
| 5,423,402 A * | 6/1995 | de Kock | 188/315 |
| 5,464,079 A * | 11/1995 | Lohberg et al. | 188/315 |
| 5,988,655 A * | 11/1999 | Sakai et al. | 280/6.159 |
| 2008/0185244 A1* | 8/2008 | Maeda et al. | 188/316 |
| 2009/0038897 A1* | 2/2009 | Murakami | 188/266.5 |

FOREIGN PATENT DOCUMENTS

| | | |
|---|---|---|
| GB | 2159604 A | 12/1985 |
| GB | 2355779 A | 5/2001 |

OTHER PUBLICATIONS

Dutch Search Report, dated Sep. 8, 2010, from corresponding Dutch application.

* cited by examiner

*Primary Examiner* — Bradley King
*Assistant Examiner* — Stephen Bowes
(74) *Attorney, Agent, or Firm* — Young & Thompson

(57) ABSTRACT

Damper which is, in particular, stiff during the inward stroke thereof and can be used, for example, as a railway damper. The piston which divides the cylinder into two chambers is provided with non-return valves which operate in both directions and are configured as characteristic. A sleeve extends from the bottom of the cylinder which is displaceable in the interior of the piston/piston rod and one end of which is connected to a reservoir and the other end of which may be connected to one of the chambers. In addition, a bottom valve is present in the cylinder. The combination of sleeve/bottom valve is fitted in such a manner that when the piston moves inwards in the cylinder, the liquid volume which has to be displaced is moved by additional rod volume which enters the cylinder via the sleeve in the reservoir. During the outward movement, the liquid is replenished from the reservoir via the bottom valve.

13 Claims, 4 Drawing Sheets

STIFF DAMPER

FIELD OF THE INVENTION

The present invention relates to a damper for railway or other applications.

BACKGROUND OF THE INVENTION

In the prior art a damper is known comprising a cylinder provided with a first attachment means and a piston which can be displaced therein and which is fitted on a hollow piston rod with a second attachment means, wherein said cylinder is divided into a first chamber and a second chamber by said piston, wherein a passage for damping fluid from the second chamber to said first chamber is present, in which passage a first main non-return valve limiting the flow of damping fluid is present, wherein said second chamber comprises the bottom of said cylinder, wherein a liquid reservoir is present which is in fluid connection with said second chamber, wherein a non-return valve is present in said fluid connection and blocks the flow from said second chamber to said liquid reservoir, a sleeve extends from said bottom, which sleeve is in fluid communication with said liquid reservoir and wherein a connection from said first chamber to said cavity via the piston is present downstream of said first main non-return valve when the piston is moved to the bottom of said cylinder.

A damper of this type is suitable for many applications, one of which is the use in railway applications and, more particularly, in attenuating the rotating movement of a wheel set with respect to the carriage body. Particularly with railway carriages travelling at high speeds, it is important to effectively attenuate the slight mutual movements between the wheel set and the carriage body at high speeds. To this end, it is important that the damper which is used is relatively stiff at high frequencies (such as from 6-8 Hz) and low speeds, that is to say that there is as little gas as possible present in the hydraulic fluid used.

GB 2,159,604 discloses an adjustable hydraulic damper which can be used for entirely different applications.

SUMMARY OF THE INVENTION

According to an aspect of the invention a damper is provided comprising a damper comprising a cylinder provided with a first attachment means, a piston which can be displaced therein and which is fitted on a hollow piston rod with a second attachment means, wherein said cylinder is divided into a first chamber and a second chamber by said piston, wherein a passage for damping fluid from the second chamber to said first chamber is present, in which passage a first main non-return valve limiting the flow of damping fluid is present, wherein said second chamber comprises the bottom of said cylinder, wherein a liquid reservoir is present which is in fluid connection with said second chamber, wherein a non-return valve is present in said fluid connection and blocks the flow from said second chamber to said liquid reservoir, a sleeve extends from said bottom, which sleeve is in fluid communication with said liquid reservoir and wherein a connection from said second chamber to said sleeve via the piston is present downstream of said first main non-return valve when the piston is moved to the bottom of said cylinder, a first auxiliary non-return valve being present in said passage, which operates in the same way as the main non-return valve and in that the space between said first main non-return valve and said first auxiliary non-return valve is directly connected to said sleeve.

According to the present invention, there is an "unpressurized" space between the first and second chamber in the passage delimited by the two non-return valves. As a result thereof, it is, on the one hand, possible to freely discharge oil to the reservoir during the inward movement in order to compensate for the piston rod volume and, on the other hand, the pressure in the chambers can be kept relatively high in order to improve the stiffness of the damper.

The attenuating movement upon displacement of the piston away from the bottom of the cylinder can be achieved by means of a second (main) non-return valve which is present in the piston.

According to a further aspect the first and second non-return valves are configured as "characteristic". This means that, in contrast to a simple non-return valve which only has to prevent return flow, the non-return valves which are configured as characteristic will only open in the desired direction of flow after a certain, essential threshold value has been exceeded. In other words, the extent to which such a (main) non-return valve opens depends on the flow through such a valve. In addition, it is possible to influence the manner of opening with respect to the build-up of pressure by means of a particular implementation of the spring load on such a non-return valve. By way of example, a gradual opening in the range of, for example, 2-50 bar is mentioned, with such non-return valves functioning as characteristic opening in the direction of flow. Of course, these valves are closed in the other direction.

During the inward movement of the piston in the cylinder, the reduction in the volume of the second chamber will not be equal to the increase in volume of the first chamber, since an increasingly larger part of the piston rod moves into the first chamber. This means that this volume has to be compensated for. According to the invention, this is achieved by removing such volume via the sleeve in the reservoir. When the piston is moved back out of the cylinder again, the "shortfall in volume" which is caused by the piston rod being moved out of the cylinder will be compensated for by liquid which flows from the reservoir into the second chamber via the bottom valve. By fitting the discharge for excess liquid during the inward movement downstream of the non-return valve which is configured as characteristic, the liquid in the second chamber can be brought to and kept at an elevated pressure. This pressure only changes during the outward movement, when liquid has to be moved from the reservoir via the bottom valve. In this case, the second non-return valve which is preferably configured as characteristic can maintain a positive pressure in the first chamber.

According to a further aspect, the first non-return valve is composed of two valves, being a main non-return valve and an auxiliary non-return valve, which are in line with one another. The auxiliary non-return valve may be configured as a conventional non-return valve, that is to say a non-return valve which opens at a slight positive pressure (for example 1 bar or less), while the main non-return valve may be configured as characteristic. The flow connection to the sleeve via the cavity provided in the piston/piston rod takes place downstream of the main non-return valve and upstream of the auxiliary non-return valve, that is to say from the connection between these two valves.

Such a structure can also be used for the second passage, that is to say the passage through which fluid moves when the piston moves away from the bottom of the cylinder. It is likewise possible for a direct connection to exist to the sleeve in a second passage in the above-described manner. In addition, according to a further advantageous embodiment, it is possible to configure the first and second passage as an (annular) chamber.

The reservoir may be coupled in any conceivable manner to both the bottom valve and the sleeve. According to a particularly simple embodiment, the first damper is configured as a two-pipe damper, as a result of which the reservoir is situated centrically with respect to the cylinder of the damper.

In accordance with a particular embodiment of the invention, the first and second non-return valves are configured in such a manner that an inward attenuation of the damper is approximately equal to an outward attenuation of the damper.

According to another preferred embodiment the shock absorber comprises a single tube and the reservoir is positioned downstream from the piston. In a more preferred embodiment this reservoir can be a gas pressurized reservoir.

According to a further particular aspect, a non-return valve which prevents a return flow from the reservoir through the sleeve is provided in the connection downstream (inward stroke) of the first non-return valve and the reservoir via the sleeve. Such a non-return valve may be configured as a bottom non-return valve, but it will be understood that it can be provided at any location on the above-described path.

According to a particular embodiment of this structure, wherein the first non-return valve is, in addition, composed of two non-return valves, one of which non-return valves is a simple non-return valve or auxiliary non-return valve, this first auxiliary non-return valve opens at a lower positive pressure than the non-return valve which has just been described and which may be configured as a bottom non-return valve. This means that during the inward stroke, initially, as large a volume as possible will flow from the second to the first chamber and only when a certain positive pressure is reached in the first chamber will the excess volume of liquid flow into the reservoir via the sleeve and the above-described bottom non-return valve.

With the application of a railway damper between a wheel set and a carriage body which is described above by way of example, the shock-absorbing means are preferably configured to be symmetrical. It will be understood that the damper can also be used for other purposes, in which case the shock-absorbing characteristics of the inward stroke differ from those of the outward stroke. This can partly be regulated by the spring assemblies acting on the non-return valves and by adapting or adjusting the flow-through openings used and the surfaces subjected to pressure, respectively.

By means of the invention, it is possible to adapt, starting from a single damper concept, by means of simple modifications which relate, in particular, to the piston and the non-return valves provided therein, to different requirements. In addition, it is possible to use a relatively slim piston rod. Moreover, the non-return valves employed, and more particularly the non-return valves which have a characteristic, can be set on a flow bench in advance, as a result of which the damper can be delivered as a completely set unit.

The combination of a main non-return valve and an associated seat may be a unit which can be fitted separately and which may be set in advance as a unit. This makes fitting and servicing of such dampers simple.

DETAILED DESCRIPTION OF EXEMPLARY EMBODIMENTS

Figure 1:
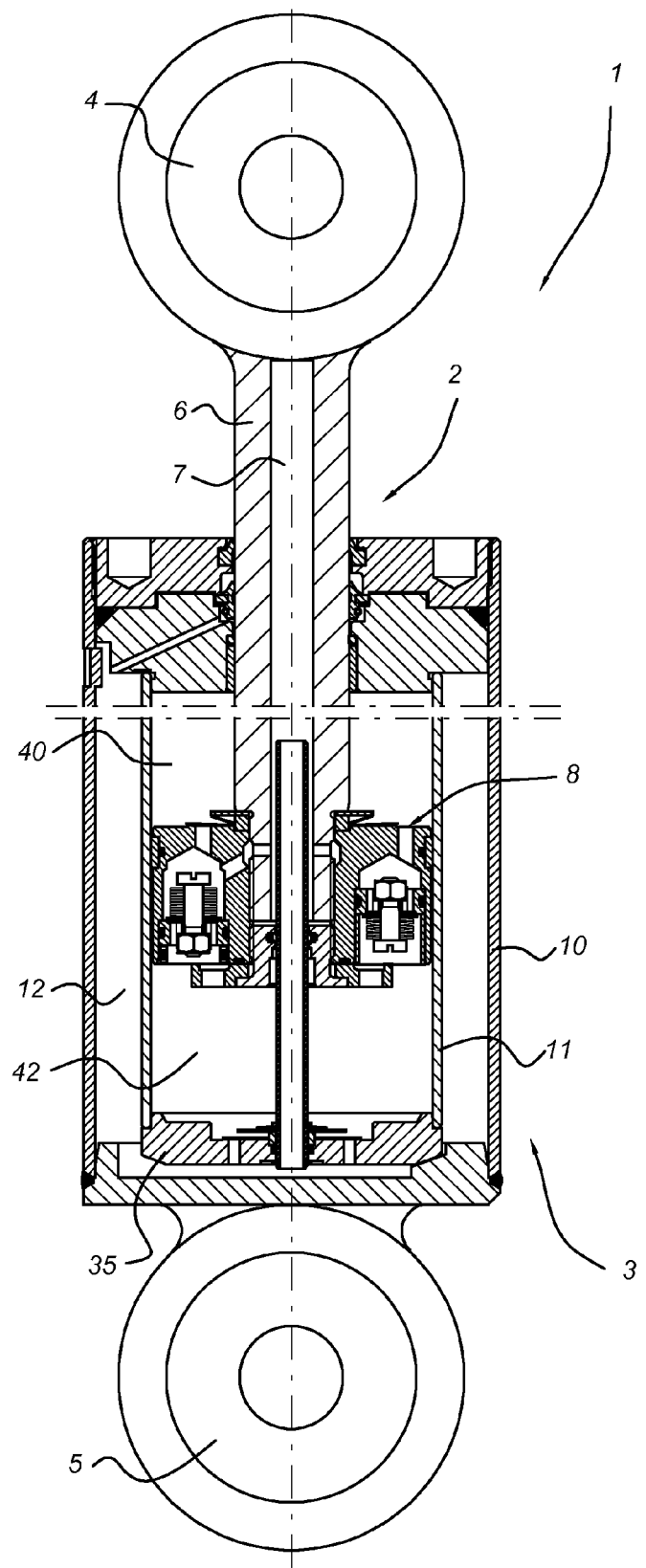
FIG. 1 shows a cross section of a first embodiment of the invention.
Figure 2:
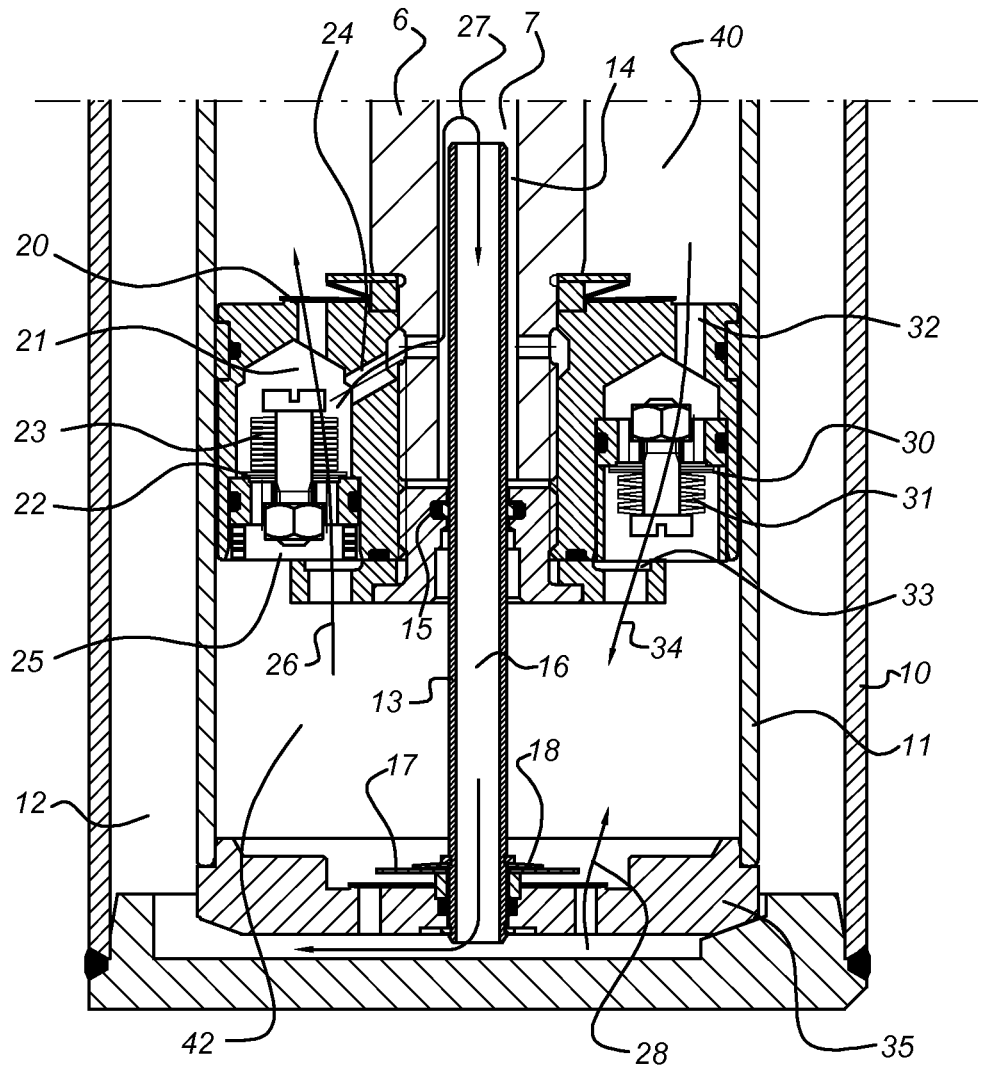
FIG. 2 shows a detail of the embodiment from FIG. 1.

In FIG. 1, the damper according to the present invention is denoted overall by reference numeral 1. FIG. 2 shows details of this damper. It consists of a cylinder part 3 into which and out of which a piston part 2 can be moved. Reference numerals 4 and 5 denote attachment means of the cylinder part 3 and piston part 2, respectively. It will be understood that these attachment means can be configured differently, depending on the intended use.

Attachment means 4 is fitted to the piston rod 6. The piston 8 is situated on the other end of the piston rod 6. That part of the piston rod 6 which is situated near the piston 8 is provided with a bore 7. A sleeve 13 extends in this bore 7. The other end of this sleeve 13 is accommodated in the bottom 35 of the cylinder part 3. The cylinder part 3 consists of an inner wall 11 with the above-described bottom 35 and an outer wall 10. Between the inner wall 11 and the outer wall 10, a reservoir 12 is delimited. The bottom 35 is also provided with a bottom valve 17 which is configured as a non-return valve. The piston divides the cylinder into a first chamber 40 and a second chamber 42.

The first passage 52 in the piston 8 is provided with a first non-return valve 22 which is configured as characteristic, that is to say that, in order to open it, a certain essential positive pressure is required in the opening direction. The initial opening pressure may be, for example, more than 50 bar. In addition, such a characteristic may have a particular opening characteristic, that is to say that when the pressure acting thereon is increased, the cross-sectional flow-through area is increased in a particular manner. A spring assembly 23 acts on this first non-return valve 22 and produces the particular opening characteristic of this non-return valve.

An auxiliary non-return valve 20 is present which acts in the same direction as the main non-return valve 22, but is configured as a simple non-return valve, that is to say which opens at a relatively low pressure of, for example, 1 bar and, more particularly 0,2 bar.

Between these two non-return valves, a passage 21 is present from which a passage 24 branches off. Between the outer side of the sleeve 13 and the bore 7, there is a clearance 14 and in this space, the liquid can flow into the inside 16 of the sleeve from passage 24.

The sleeve is sealed with respect to the piston by means of a seal 15.

The piston is also provided with a non-return valve which acts in the opposite direction in the second passage 53 and which is referred to as the second non-return valve and is denoted by reference numeral 30. The latter is also provided with a spring assembly 31 and this second non-return valve is also configured as characteristic.

The above-described damper operates as follows:

During the inward stroke of the piston, the second non-return valve 30 will be closed and remain closed. Liquid can only flow out of the second chamber 42 via passage 25 and the first main non-return valve 22. After the first main non-return valve 22, the liquid can either enter the first chamber 40 via the auxiliary non-return valve 20 or flow into the inside of the sleeve 16. The first flow movement is indicated by arrow 26, while the movement of liquid into the sleeve 13 is indicated by arrow 27. As a result of this embodiment, the volume reduction which is caused by the fact that an increasingly larger part of the piston rod 6 which is moving therein is accommodated therein can be compensated for by liquid flowing into the reservoir 12 via sleeve 13.

During the return movement, the auxiliary non-return valve 20 prevents liquid from flowing from the chamber 40 into the sleeve 16. In addition, the main non-return valve 22 acts as an obstruction. Liquid can only flow from chamber 40 to chamber 42 via the main non-return valve 30 along arrow 34. Moreover, additional volumes of liquid have to be supplied due to the part of the piston rod leaving the cylinder. This liquid is supplied from the reservoir 12 according to the direction of arrow 28 via a non-return valve 17 which is loaded by a spring 18.

Figure 3:
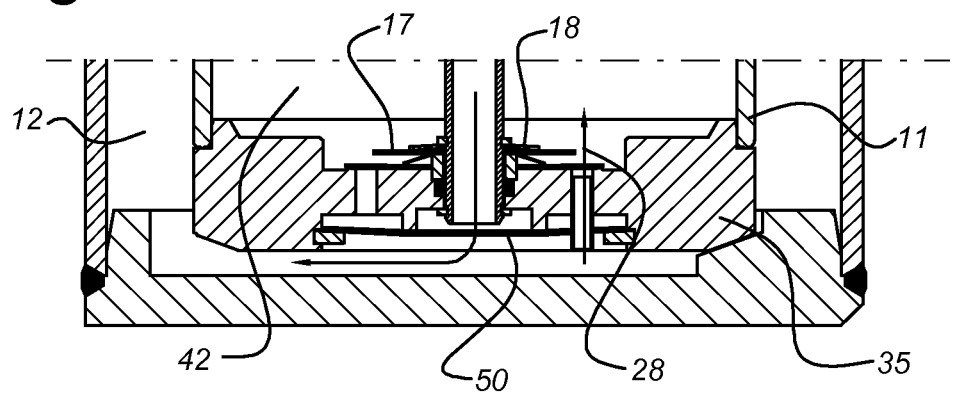
FIG. 3 shows a detail of a second embodiment of the invention.

A further improvement of the concept described herein can be achieved by means of the embodiment of FIG. 3. This embodiment is identical to the embodiment described with reference to FIG. 1, apart from the fact that in this case a bottom non-return valve 50 is present. This bottom non-return valve 50 only allows a flow in the direction from of the bore 7 into the direction of the reservoir 12. This non-return valve 50 is configured as a simple non-return valve, that is to say that it has no particular characteristic and opens at a low pressure. As a result thereof, a return flow from the reservoir 12 into the bore 7 and thus into passage 24, possibly in the direction of the chamber 40 can be prevented.

When such a bottom non-return valve is used, it preferably has a greater stiffness than the second auxiliary non-return valve 20. This means that the bottom non-return valve opens after valve 20 when the pressure is increased.

Figure 4:
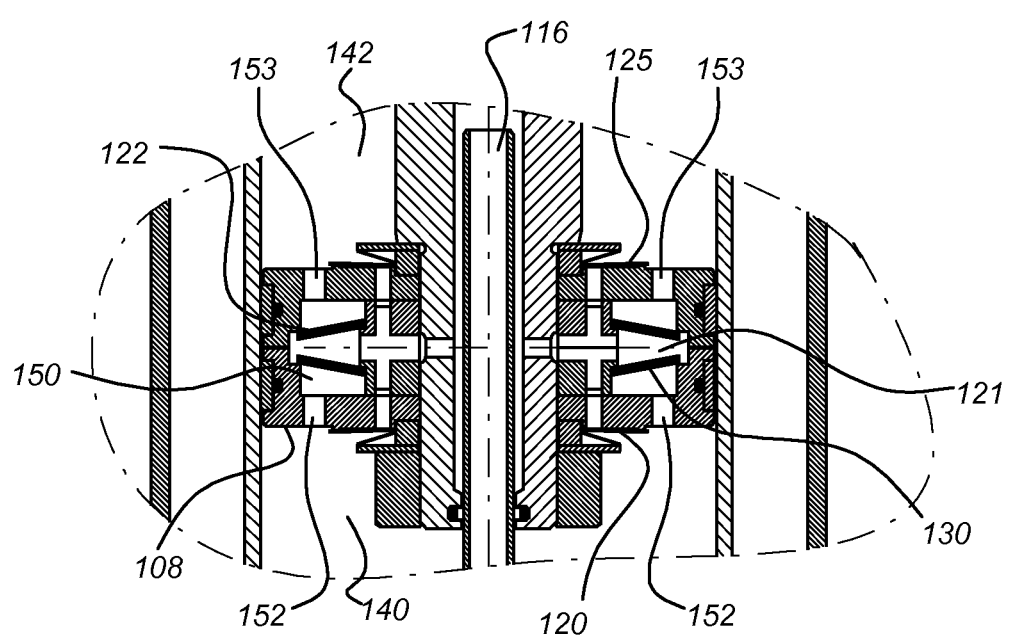
FIG. 4 shows a further variant of the invention.

FIG. 4 shows a variant of the above-described piston 8 which is denoted overall by reference numeral 108. Instead of a first passage indicated by arrow 26 and a second passage indicated by arrow 34 which are physically separated from one another, in this case a single annular chamber 150 is provided which is connected to chambers 140 and 142, respectively, via a number of openings 152 and 153, respectively. This chamber 150 is divided into different parts by means of ring valves 122 and 130, with ring valve 122 providing the characteristic attenuation or damping when the piston moves to the bottom of the cylinder (not shown) and the ring valve 130 providing the characteristic attenuation during the reverse movement. The space situated between these ring valves is denoted by reference numeral 121. An auxiliary non-return valve which cooperates with the ring valve 122 is denoted by reference numeral 120, while an auxiliary non-return valve 125 cooperates with ring valve 130. As in the previous example, the space 121 is connected to the sleeve 116.

This means that, compared to the variant described earlier, the space 121 is an unpressurized space during the inward stroke of the piston rod. However, a connection to the sleeve 116 also exists during the return movement where the assembly consisting of valves 130 and 125 becomes active.

Figure 5:
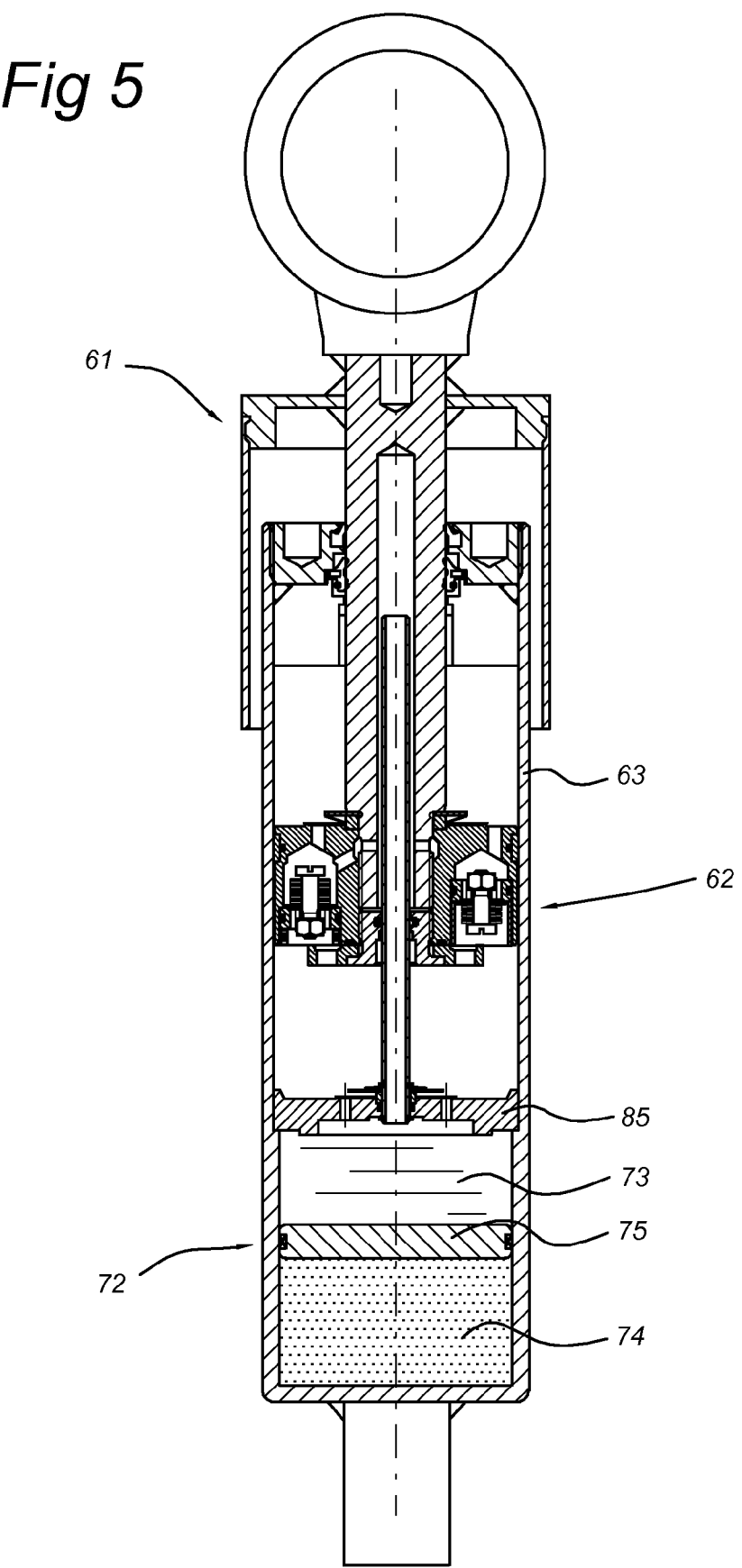
FIG. 5 shows a further embodiment of the invention.

In FIG. 5 a further embodiment of the damper is shown. This is generally referred to by 61 and comprises a piston part 62 enclosed in a cylindrical part 63. This cylindrical part 63 is the outer boundary of the damper because a reservoir 72 is delimited at the lower end of cylinder part 63. To that end bottom 85 is fixedly connected to cylinder part 3. The space there below (as seen in the drawing) delimits the reservoir 72. The upper part of the reservoir is indicated by 73 whilst lower part indicated with 74 is separated through a movable disc shaped piston 75 there from. Space 74 is filled with a gas whilst space 73 is filled with the damping liquid.

Basically the further structure of the damper 61 corresponds to what is shown referring to FIGS. 1-4 with the exception that reservoir 12 is replaced by reservoir 72 and more particular part 73 thereof. The connections to the reservoir 73 are the same as the connections to reservoir 12 in the previous embodiments.

It is noticed that both in reservoir 12 and in reservoir 73 only a relatively low pressure is present. I.e. the high pressure which results from damper movements will not be transferred to either reservoir 12 or reservoir 73. In case of the presence of a gas filled damper such as shown in FIG. 5 this means that the gas filling at 74 should be sufficient for preventing foaming and other undesirable effects in the low pressure fluid of the damper only. Furthermore this means that pressure of the gas at 74 does not substantially effect inward movement of the damper because of the structure chosen.

Upon reading the above, those skilled in the art will immediately be able to think of variants which are covered by the scope of the attached claims and are obvious after having read the above. Furthermore it is emphasized that the damper would not only be used for railway purposes for example between bogey's but also adapted for use for damping (vertical) wheel movements in any kind of vehicle. Although positioning of the damper is preferably horizontal in special embodiments also the direction of the centre line of the piston rod might be in a direction different from horizontal.

The invention claimed is:
1. A damper, comprising:
a cylinder provided with a first attachment means; and
a piston displaceable within said cylinder and which is fitted on a hollow piston rod with a second attachment means,
wherein said cylinder is divided into a first chamber and a second chamber by said piston,
wherein a first passage for damping fluid from the second chamber to said first chamber is present, a first main non-return valve determining a characteristic of attenuation for limiting the flow of damping fluid being present in said first passage, and a first auxiliary non-return valve being present in said first passage and operable in the same direction as the first main non-return valve so that both of said first main non-return valve and said first auxiliary non-return valve only permit fluid flow from the second chamber to the first chamber,
a space being defined in the first passage between the first main non-return valve and the first auxiliary non-return valve, the first main non-return valve being arranged at a second chamber side of said space, and the first auxiliary non-return valve being arranged at a first chamber side of said space,
wherein said second chamber comprises a bottom of said cylinder,
wherein a liquid reservoir is present and in fluid connection with said second chamber,
wherein another non-return valve is present in said fluid connection between the liquid reservoir and the second chamber so as to block fluid flow from said second chamber to said liquid reservoir, and a sleeve extends from the bottom of said cylinder, the sleeve being in fluid communication with said liquid reservoir at the bottom of the cylinder, and
wherein said space between said first main non-return valve and said first auxiliary non-return valve is directly connected to said sleeve so that a connection from said second chamber to said sleeve is present via the piston downstream of said first main non-return valve so as to only provide fluid flow from the second chamber to said sleeve and said reservoir when the piston is moved to the bottom of said cylinder.

2. The damper according to claim 1, wherein an outside wall of said sleeve is arranged at a distance from an inside wall of said piston and said sleeve is sealed against said piston.

3. The damper according to claim 2, wherein a bottom non-return valve which blocks the flow from said reservoir into said sleeve is arranged in the connection between the sleeve and the reservoir.

4. The damper according to claim 3, wherein said bottom non-return valve opens at a higher positive pressure than said first auxiliary non-return valve.

5. The damper according to claim 1, comprising a second passage for damping fluid from said first chamber to said second chamber, a second main non-return valve being present in said second passage which limits the flow of damping fluid.

6. The damper according to claim 5, wherein said first and second non-return valves are configured in such a manner that an inward attenuation of said damper is approximately equal to an outward attenuation of said damper.

7. The damper according to claim 1, wherein each of said first and second main non-return valves comprises a valve seat and valve body which form a unit.

8. The damper according to claim 1 comprising a railway damper.

9. The damper according to claim 7, wherein said damper is arranged between a wheel set and a carriage body of a railway carriage.

10. The damper according to claim 1, wherein said reservoir is defined between the cylinder and an outer wall being provided there around.

11. The damper according to claim 1, wherein said reservoir is defined in an extension of said cylinder.

12. The damper according to claim 1, wherein said reservoir comprises a damping liquid chamber and a pressurized gas chamber separated by a moveable gas and liquid tight separation.

13. The damper according to claim 1, wherein a bottom non-return valve which blocks the flow from said reservoir in said sleeve is arranged in the connection between the sleeve and the reservoir.

* * * * *